(12) United States Patent
Matsudaira et al.

(10) Patent No.: US 12,418,258 B2
(45) Date of Patent: Sep. 16, 2025

(54) MOTOR CONTROL DEVICE

(71) Applicant: FANUC CORPORATION, Yamanashi (JP)

(72) Inventors: Tetsuro Matsudaira, Yamanashi-ken (JP); Yoshinori Sakai, Yamanashi-ken (JP); Shuuji Kudou, Yamanashi-ken (JP); Yoshikiyo Tanabe, Yamanashi-ken (JP); Toshihiro Fujimori, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 202 days.

(21) Appl. No.: 18/549,175

(22) PCT Filed: Mar. 9, 2022

(86) PCT No.: PCT/JP2022/010163
§ 371 (c)(1),
(2) Date: Sep. 6, 2023

(87) PCT Pub. No.: WO2022/202304
PCT Pub. Date: Sep. 29, 2022

(65) Prior Publication Data
US 2024/0162845 A1 May 16, 2024

(30) Foreign Application Priority Data
Mar. 22, 2021 (JP) .................................. 2021-047074

(51) Int. Cl.
*H02P 27/08* (2006.01)
*H02M 1/00* (2007.01)
*H02P 29/024* (2016.01)

(52) U.S. Cl.
CPC ............ *H02P 27/08* (2013.01); *H02M 1/007* (2021.05); *H02P 29/024* (2013.01); *H02P 2201/07* (2013.01)

(58) Field of Classification Search
CPC .......... H02J 7/345; H02J 9/061; H02J 7/0029; H02J 7/0068; H02M 1/36; H02M 1/32;
(Continued)

(56) References Cited

U.S. PATENT DOCUMENTS

2006/0224360 A1* 10/2006 Kishimoto ............ B60L 3/0023
702/183
2010/0030412 A1 2/2010 Mitsutani

FOREIGN PATENT DOCUMENTS

| CN | 110176898 A | 8/2019 |
| JP | H08205531 A | 8/1996 |

(Continued)

OTHER PUBLICATIONS

Office Action with Search Report for Taiwanese Patent Application No. 111109732 dated May 5, 2025, 8 pages, no translation available.

(Continued)

*Primary Examiner* — Antony M Paul
(74) *Attorney, Agent, or Firm* — Carter, DeLuca & Farrell LLP

(57) ABSTRACT

A motor control device includes a DC/DC converter that steps up or steps down a voltage of a direct current power source and performs charging, while controlling an inrush current to a smoothing capacitor; a monitor circuit for the output of the DC/DC converter; and a control part that turns (Continued)

the operation of the DC/DC converter on and off, and turns the DC/DC converter off when the monitor circuit has detected an abnormality.

4 Claims, 2 Drawing Sheets

(58) Field of Classification Search
CPC .......... H02M 7/125; H02M 3/01; H02H 3/20; H02H 3/044; H02H 2231/04; H02H 47/002; H02P 2201/07; H02P 29/024; H02P 29/0241; H02P 3/18; H02P 5/74; H02P 2201/11; H02P 2201/09; H02P 2201/03; H02P 2201/05; H02P 2207/073; H02P 2207/076; H02P 2101/45; H02P 2207/05; H02P 2209/05; H02P 27/06; H02P 27/08; H02P 27/04; H02P 6/12; H02P 6/24; H02P 3/00; H02P 3/065; H02P 29/027; H02P 9/102; H02P 25/062; H02P 25/064; B60L 2210/10; B60L 2210/14; B60L 2210/40; B60L 2270/20; B60L 3/0046; H01H 47/002; H01H 2231/04
See application file for complete search history.

(56) References Cited

FOREIGN PATENT DOCUMENTS

| | | | |
|---|---|---|---|
| JP | 2010154642 | A | 7/2010 |
| JP | 2014124090 | A | 7/2014 |
| JP | 2018129910 | A | 8/2018 |
| JP | 2021027646 | A | 2/2021 |
| TW | 201721166 | A | 6/2017 |
| TW | 1717424 | B | 2/2021 |
| WO | 2011161925 | A1 | 12/2011 |

OTHER PUBLICATIONS

International Search Report issued by the Japan Patent Office acting as the International Searching Authority in relation to International Application No. PCT/JP2022/010163 dated Apr. 26, 2022 (3 pages) along with English language translation (2 pages).
Written Opinion of the International Searching Authority issued by the Japan Patent Office acting as the International Searching Authority in relation to International Application No. PCT/JP2022/010163 dated Apr. 26, 2022 (4 pages).

* cited by examiner

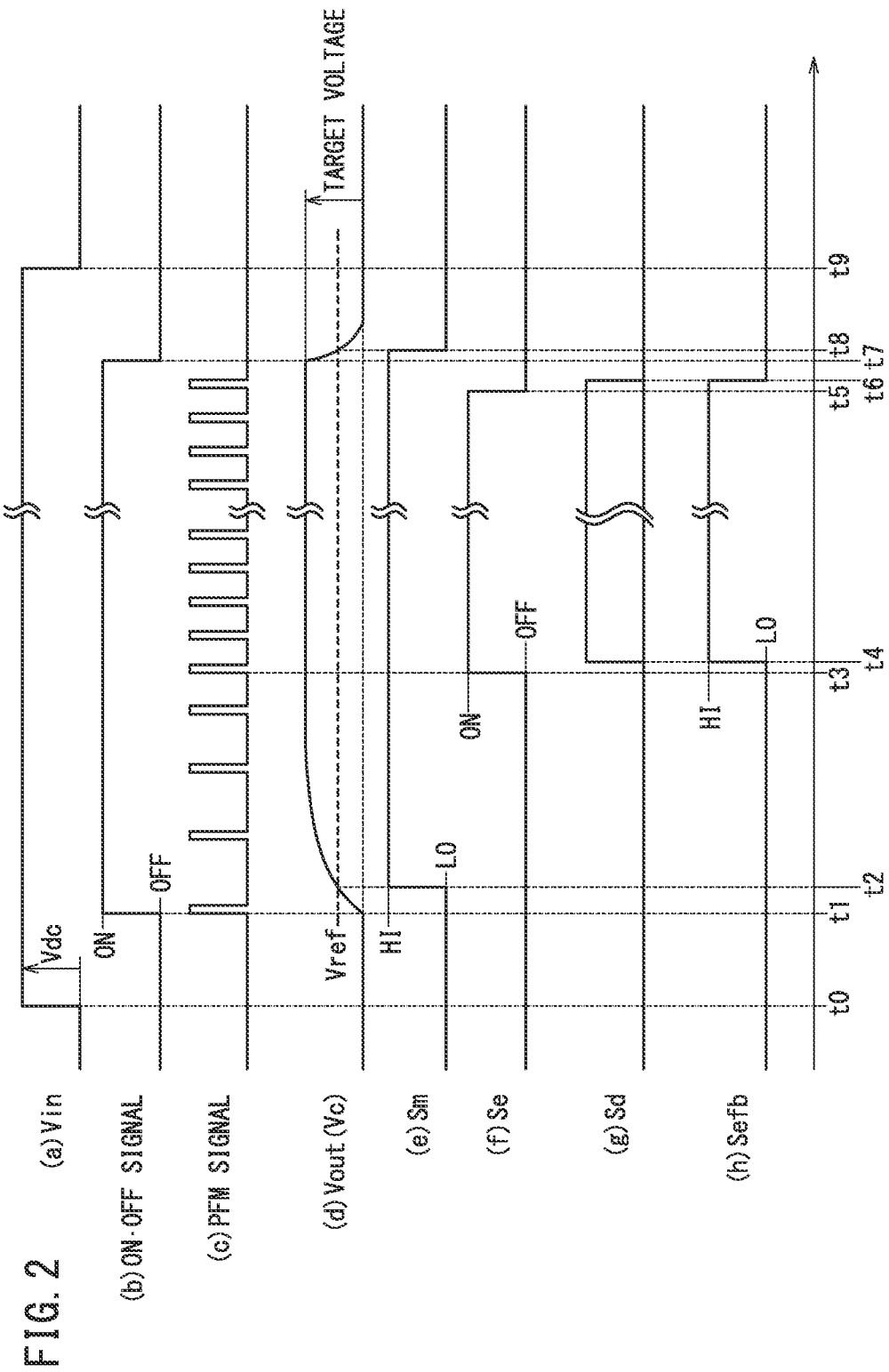

MOTOR CONTROL DEVICE

CROSS-REFERENCE TO RELATED APPLICATIONS

This application is a national phase entry under 35 U.S.C. 371 of PCT International Application No. PCT/JP2022/010163, filed Mar. 9, 2022, which claims priority to Japanese Patent Application No. 2021-047074, filed Mar. 22, 2021, the disclosure of each of these applications is expressly incorporated herein by reference in their entirety.

TECHNICAL FIELD

The present invention relates to a motor control device that charges a smoothing capacitor using a DC (direction current) power supply and controls driving of a motor using the smoothing capacitor.

BACKGROUND ART

For example, FIG. 1 of WO 2011/161925 A1 discloses a power supply apparatus for an electric vehicle in which a connection circuit 30 made up from power components is provided between a DC power supply (a power supply 11 and a DC-DC converter 18) and an inverter 19 for driving a three phase motor 14.

As shown in FIG. 2 of WO 2011/161925 A1, the connection circuit 30 is a power circuit including a power component in which a second switch 32 is connected in series with respect to a first switch 31 and an inrush prevention resister 33 connected in parallel.

In the connection circuit 30, when the DC high voltage of the output of the DC-DC converter 18 is applied to the inverter 19, the first switch 31 is in an open state and the second switch 32 is in a closed state. Because of the switches in such states, the current flowing into the input side of the inverter 19 is limited by the inrush prevention resistor 33, whereby an excessive inrush current is prevented from flowing into the inverter 19.

SUMMARY OF THE INVENTION

Incidentally, in general, when the voltage of the DC power supply becomes a high voltage of about DC 300 [V] or more, power components each of which is large in size and is of high withstand voltage are required, and thus it is necessary to have a wide space for a mounting area.

The large-sized power components include, for example, an inrush prevention resistor (pre-charge resistor), an electromagnetic contactor connected in series to the pre-charge resistor, an electromagnetic switch connected in parallel to the series circuit of the pre-charge resistor and the electromagnetic contactor.

The present invention has been made in consideration of such a problem, and an object is to provide a motor control device including a DC-DC converter wherein the motor control device can replace power components including a pre-charge resistor, an electromagnetic contactor, and an electromagnetic switch and can be arranged in a small space of a mounting area.

According to an aspect of the present invention, there is provided a motor control device that charges a smoothing capacitor using a DC power supply and controls driving of a motor using the smoothing capacitor, the motor control device including: a DC-DC converter configured to charge the smoothing capacitor by stepping up or stepping down an output voltage of the DC power supply while limiting an inrush current into the smoothing capacitor; a monitor circuit configured to monitor whether an output of the DC-DC converter is being generated and output a monitor signal; and a control unit configured to output an ON signal for starting or maintaining an operation of the DC-DC converter or an OFF signal for stopping the operation of the DC-DC converter and receive the monitor signal, wherein the control unit outputs the OFF signal to the DC-DC converter when the control unit has detected the abnormality of the DC-DC converter by means of the monitor signal.

According to the present invention, a space for a mounting area can be reduced since the power component including the pre-charge resistor, the electromagnetic contactor, and the electromagnetic switch can be replaced by the power/electronic component (power/electronic circuit) including the DC-DC converter, the monitor circuit, and the control unit.

BRIEF DESCRIPTION OF DRAWINGS

FIG. 2 is a time chart for explaining the operation of the motor control device according to the embodiment.

DETAILED DESCRIPTION OF THE INVENTION

Figure 1:
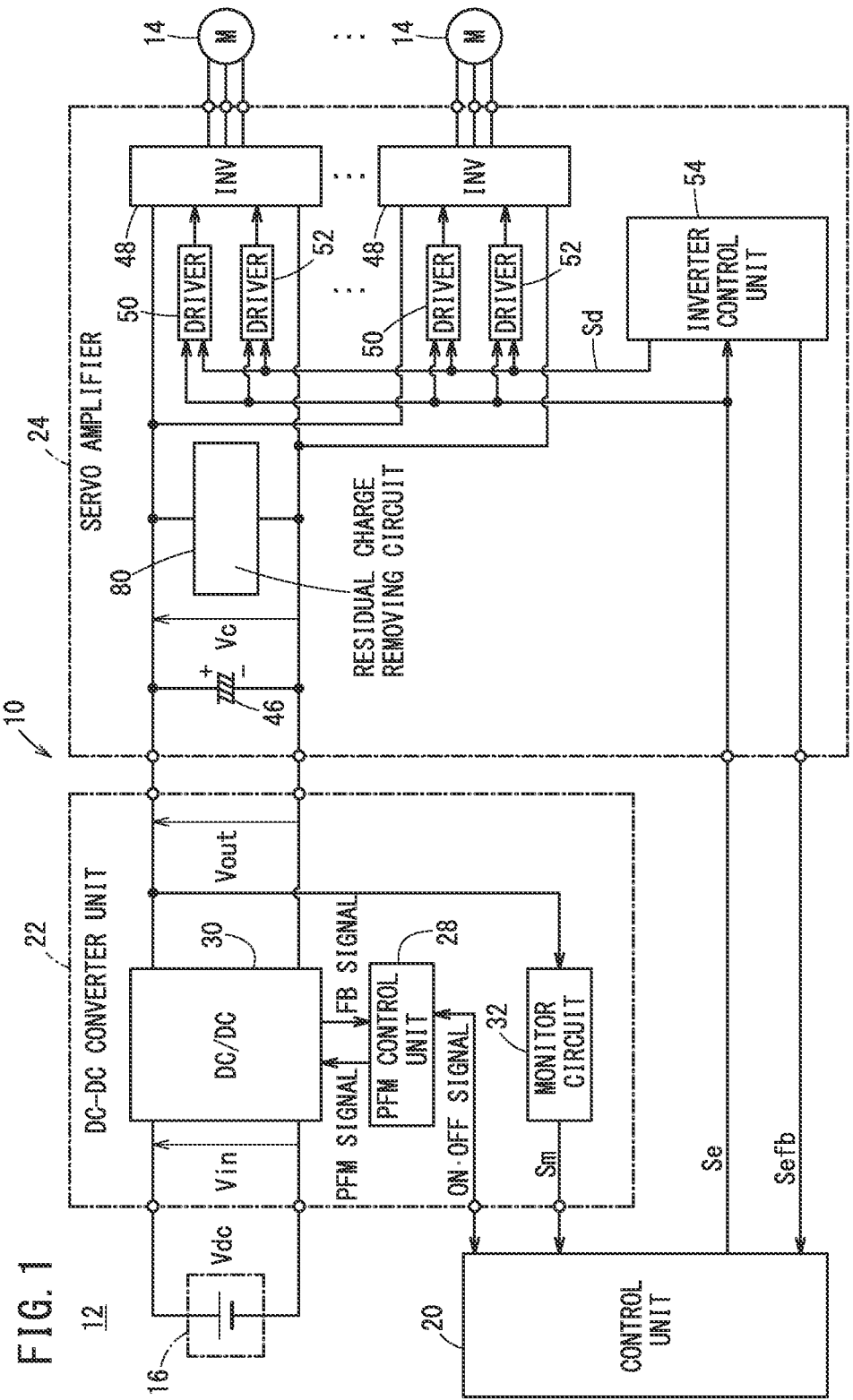
FIG. 1 is a circuit block diagram illustrating an example of a configuration of a servo control system in which a motor control device according to an embodiment is incorporated.

Embodiments of a motor control device according to the present invention will be described in detail below with reference to the accompanying drawings.

[Configuration]

FIG. 1 is a circuit block diagram illustrating an example of a configuration of a servo control system 12 in which a motor control device 10 according to an embodiment is incorporated.

The servo control system 12 basically includes the motor control device 10, a DC power supply 16 connected to an input side of the motor control device 10, and a servo motor (hereinafter referred to as a motor) 14 connected to an output side of the motor control device 10.

The motor 14 is made up from, for example, six three-phase induction motors or the like for rotationally driving respective axes of a six-axis robot (not shown).

In this embodiment, the DC power supply 16 outputs a DC voltage (output voltage) Vdc of 600 [V].

The motor control device 10 basically includes a control unit 20, a DC-DC converter unit 22, and a servo amplifier 24.

The DC-DC converter unit 22 includes a DC-DC converter 30, a PFM control unit 28, and a monitor circuit 32.

The control unit 20 outputs an ON (operation start or operation maintenance)/OFF (operation stop) signal (ON/OFF signal) to the PFM control unit 28.

The DC-DC converter 30 includes a switching transistor, a switching transformer, and the like, and is configured as, for example, an insulated type or a non-insulated type, and may be of a step-up type or a step-down type.

When the ON signal that is an ON command is supplied from the control unit 20, the PFM control unit 28 adjusts, with reference to a feedback signal (FB signal) detected by the DC-DC converter 30, the frequency of the PFM signal that drives the switching transistor.

In this embodiment, the DC-DC converter 30 steps down the DC voltage Vdc of 600 [V] to a DC voltage (output voltage) Vout of 300 [V].

The monitor circuit 32 supplies a monitor signal Sm of the output voltage Vout to the control unit 20. Although the monitor circuit 32 may be a voltage sensor, a hysteresis comparator is employed in this embodiment.

In this embodiment, the monitor circuit 32 generates a high-level monitor signal Sm (see (e) of FIG. 2) when the output voltage Vout is higher than the reference voltage Vref (see (d) of FIG. 2), generates a low-level monitor signal Sm (see (e) of FIG. 2) when the output voltage Vout is lower than a reference voltage Vref, and outputs the generated monitor signal Sm to the control unit 20.

In this embodiment, the ON/OFF signal (see (b) of FIG. 2) supplied from the control unit 20 to the PFM control unit 28 includes a high-level ON signal for setting the PFM control unit 28 to an active state and a low-level OFF signal for setting the PFM control unit 28 to a cutoff state.

The servo amplifier 24 includes a smoothing capacitor 46, a residual charge removing circuit 80, an inverter 48 for driving the motor 14, drivers 50, 52 for driving the inverter 48, and an inverter control unit 54.

The residual charge removing circuit 80 removes the residual charge of the smoothing capacitor 46 at the end of the operation of the servo amplifier 24.

The inverter control unit 54 supplies the drivers 50, 52 with an inverter drive signal Sd that is a PWM signal.

In this case, the output voltage Vout of the DC-DC converter unit 22 is applied to the input side of the servo amplifier 24, and the motor 14 is connected to the output side of the servo amplifier 24.

Each of the inverters 48 has a configuration in which, for example, six power transistors such as IGBTs are connected in a full-bridge configuration.

Based on the inverter drive signal Sd, which is a PWM signal from the inverter control unit 54, the driver 50 drives the high side of the full-bridge connection transistors forming the inverter 48 to be ON or OFF, and the driver 52 drives the low side of the full-bridge connection transistors to be ON or OFF.

The control unit 20 further outputs, as a so-called safe-torque-off signal, a driver enable signal Se (see (f) of FIG. 3) indicating whether the operation of the drivers 50, 52 is enabled or disabled, and supplies the driver enable signal Se to one input terminal of the drivers 50, 52 of the servo amplifier 24.

The driver enable signal Se indicates the disablement of the drivers 50, 52 when being in a low-level OFF state, and indicates the enablement of the drivers 50, 52 when being in a high-level ON state.

When the driver enable signal Se is in the high-level ON state, the drivers 50, 52 are in a standby state. The drivers 50, 52 in the standby state are brought into an active state by the inverter drive signal Sd supplied from the inverter control unit 54 to the other input terminal, thereby controlling the inverter 48.

In this case, the rotation of the motor 14 is controlled via the inverter 48. That is, the rotation of the motor 14 is controlled by the three-phase alternating current supplied from the inverter 48, and the rotation of the axis of the robot (not shown) pivotally supported by the motor 14 is controlled.

On the other hand, when the driver enable signal Se is in the low-level OFF state, the drivers 50, 52 are in the cutoff state and the operation thereof is stopped, and the inverter 48 is in the stop state, so that the motor 14 does not rotate.

In this case, even if the inverter drive signal Sd is being supplied from the inverter control unit 54 to the drivers 50, 52, when the driver enable signal Se in the low-level OFF state is supplied to the drivers 50, 52, the drivers 50, 52 stop moving and the inverter 48 stops moving. That is, the rotation of the motor 14 is stopped.

In other words, the two input terminals of the drivers 50, 52 enable the drivers 50, 52 to operate like a two-input AND circuit.

In this way, the driver enabling signal Se sent from the control unit 20 functions as a command signal for commanding the servo amplifier 24 to activate or stop the inverter 48.

Further, when the inverter control unit 54 (servo amplifier 24) receives the driver enable signal Se in the high-level ON state from the control unit 20 and when the inverter control unit 54 continues to receive the driver enable signal Se in the ON state, the inverter control unit 54 returns, as a response signal, a high-level driver feedback signal Sefb corresponding to the driver enable signal Se in the ON state to the control unit 20.

When the inverter control unit 54 (servo amplifier 24) receives the driver enable signal Se in the low-level OFF state from the control unit 20 and when the inverter control unit 54 continues to receive the driver enable signal Se in the OFF state, the inverter control unit 54 returns, as a response signal, a low-level driver feedback signal Sefb corresponding to the driver enable signal Se in the OFF state to the control unit 20.

In this way, the control unit 20 and the inverter control unit 54 (servo amplifier 24) are configured to be able to communicate with each other with the driver enable signal Se (command signal) and the driver feedback signal Sefb (response signal).

When the driving of the motor 14 through the inverter 48 is stopped or terminated, the residual charge removing circuit 80 of the servo amplifier 24 discharges the charge accumulated in the smoothing capacitor 46 through an internal discharge resistor to reduce a capacitor voltage Vc, which is the voltage between the terminals of the smoothing capacitor 46, to a predetermined voltage or less.

Each of the control unit 20, the PFM control unit 28, and the inverter control unit 54 is configured by a microcomputer including one or more processors (CPU), a memory (ROM and RAM), a timer, and an input/output interface. Various functional units are effected by the CPU executing software (control program) stored in the memory. These functions can also be effected by hardware.

[Operation]

The operations of the motor control device 10 incorporated in the servo control system 12, which is basically configured as described above, will be described in detail below with reference to the time chart shown in FIG. 2.

As shown in (a) of FIG. 2, at a time point t0, a predetermined time before the start of driving of the motor 14 (time point t4), the DC voltage Vdc (Vdc=600 [V]) is applied as the input voltage Vin from the DC power supply 16 to the primary side of the DC-DC converter 30 of the DC-DC converter unit 22.

As shown in (b) of FIG. 2, at a time point t1, a predetermined time after the time point t0, the control unit 20 supplies the PFM control unit 28 with an ON signal that changes from a low level to a high level that instructs the PFM control unit 28 to start operation.

As shown in (c) of FIG. 2, from the time point t1 when the ON signal is supplied to the time point t3, the PFM control unit 28 outputs the PFM signal having a gradually increasing frequency to the DC-DC converter 30.

As shown in (d) of FIG. 2, the voltage Vout (Vc) for supplying the capacitor current to the smoothing capacitor 46 is generated on the secondary side of the DC-DC converter 30 from the time point t1 in response to the PFM signal having the gradually increasing frequency. From the time point t1, this voltage Vout (Vc) gradually charges the smoothing capacitor 46 while limiting the inrush current to the smoothing capacitor 46, and gradually increases the capacitor voltage Vc, the voltage between the terminals of the smoothing capacitor 46.

As shown in (d) and (e) of FIG. 2, the monitor circuit 32 continuously compares the output voltage Vout with the reference voltage Vref, and while the output voltage Vout, which is a comparison voltage, is higher than the reference voltage Vref, the monitor circuit 32 outputs to the control unit 20 a high-level monitor signal Sm indicating that the output voltage Vout of the DC-DC converter 30 is normally being output.

That is, as shown in (e) of FIG. 2, the monitor signal Sm output from the monitor circuit 32 transitions from the low level to the high level at the time point t2.

As shown in (d) of FIG. 2, at a time point t3 when the voltage Vout reaches a target voltage of DC 300 [V] (target voltage), the PFM control unit 28 finely adjusts the frequency of the PFM signal in accordance with the FB signal from the DC-DC converter 30 so that the voltage Vout is maintained at Vout=300 [V].

At the time point t3, the PFM control unit 28 notifies the control unit 20 that the voltage Vout has reached the target voltage. When the monitor circuit 32 is configured by a voltage sensor, the control unit 20 recognizes that the output voltage Vout has reached the target voltage based on the voltage value of the monitor signal Sm of the monitor circuit 32.

At the time point t3 when the control unit 20 receives the notification from the PFM control unit 28, in order to enable the operation of the inverter control unit 54 of the servo amplifier 24, the control unit 20 supplies the inverter control unit 54 and the drivers 50, 52 of the servo amplifier 24 with a driver enable signal Se that transitions from a low-level OFF state to a high-level ON state as shown in (f) of FIG. 2.

At time point t3, the drivers 50, 52 transition from the OFF state to the standby state.

As shown in (g) of FIG. 2, from a time point t4 on, the time point t4 being a slight time lag away from the time point t3, the inverter control unit 54 of the servo amplifier 24 supplies the drivers 50, 52 with the inverter driving signal Sd, which is a PWM signal following a predetermined sequence, activates the drivers 50, 52 and drives the inverters 48, and controls the driving of the motor 14 via the inverters 48.

Next, as shown in (f) of FIG. 2, at the time point t5, the control unit 20 changes the driver enable signal Se in the high-level ON state to the low-level OFF state and supplies the driver enable signal Se to the drivers 50, 52 and the inverter control unit 54.

At the time point t5, the drivers 50, 52 are instantaneously brought into a cutoff state by the low-level OFF-state driver enable signal Se, the driving of the inverter 48 is stopped, and the motor 14 is stopped.

As shown in (g) and (h) of FIG. 2, at a time point t6 after a slight time lag from the time point t5, the inverter control unit 54 stops supplying the drivers 50, 52 with the inverter-driving signal Sd, which is a PWM signal, and returns a low-level driver feedback signal Sefb to the control unit 20 as a response signal corresponding to the low-level driver enabling signal Se.

Next, as shown in (b) of FIG. 2, at the time point t7, the control unit 20 changes the ON/OFF signal from the high-level ON signal to the low-level OFF signal to bring the PFM control unit 28 into the cutoff state.

Thus, the step-down operation caused by the switching operation of the DC-DC converter 30 is stopped.

At the time point t7, the residual charge removing circuit 80 in the active state causes the charge accumulated in the smoothing capacitor 46 to disappear (discharge) with a predetermined time constant via a discharge resister (not shown).

As shown in (d) of FIGS. 2 and (e) of FIG. 2, when the capacitor voltage Vc (the voltage Vout outputted from the DC-DC converter 30) becomes lower than the reference voltage Vref at a time point t8, during the discharging, the monitor signal Sm of the monitor circuit 32 changes from a high level to a low level and is detected by the control unit 20.

Thereafter, at a time point t9, the application of the DC voltage Vdc from the DC power supply 16 is stopped. As a result, the input voltage Vin of the DC-DC converter unit 22 becomes 0V, and the operation of the servo control system 12 including the motor control device 10 is terminated. The time point t7 at which the OFF signal is sent out which is an OFF command for the DC-DC converter unit 22 and the time point t5 at which the low-level OFF command (OFF-state) of the driver enable signal Se is sent out may be the same time point to be a power shut-off command for the motor 14 from the control unit 20.

[Description of Effects of Embodiment]

When the monitor signal Sm does not become a high level even after a predetermined time {(t1−t2)+Δt: Δt is a redundancy component} has passed after supplying the ON signal at the time point t1, the control unit 20 determines that the DC-DC converter 30 is in an abnormal state, and outputs the OFF signal to the PFM control unit 28 to stop the generation of the PFM signal by the PFM control unit 28, thereby stopping the operation of the DC-DC converter 30 (the DC-DC converter unit 22).

When the monitor signal Sm transitions from the high level to the low level due to a failure or the like of the DC-DC converter 30 between the time point t4 and the time point t5, the control unit 20 determines that the DC-DC converter 30 is in an abnormal state and outputs the OFF signal to the PFM control unit 28 to stop the generation of the PFM signal by the PFM control unit 28, thereby stopping the operation of the DC-DC converter 30 (the DC-DC converter unit 22).

In this case, when the control unit 20 detects that the monitor signal Sm has transitioned from the high level to the low level due to a failure or the like of the DC-DC converter 30, the control unit 20 outputs an OFF signal to the DC-DC converter 30 and simultaneously transitions the driver enable signal Se to a low-level OFF state, thereby bringing the drivers 50, 52 of the servo amplifier 24 into the cutoff state, immediately stopping the driving of the inverter 48, and stopping the rotation of the motor 14.

The control unit 20 also supplies the OFF signal to the PFM control unit 28 to stop the operation of the DC-DC converter 30 when the control unit 20 fails to detect, within a predetermined time, the driver feedback signal Sefb that changes from the low level to the high level and is supposed to come back from the inverter control unit 54 even though the control unit 20 sent the driver enable signal Se transitioning from the OFF state to the ON state to the inverter control unit 54 of the servo amplifier 24 at the time point t3.

Further, the control unit 20 also supplies the OFF signal to the PFM control unit 28 to stop the operation of the DC-DC converter 30 when the control unit 20 fails to detect, within a predetermined time, the driver feedback signal Sefb that changes from the high level to the low level and is supposed to come back from the inverter control unit 54 even though the control unit 20 sent the driver enable signal Se transitioning from the ON state to the OFF state to the inverter control unit 54 of the servo amplifier 24 at the time point t5.

As described above, in the case of the motor control device 10 according to the present embodiment, the pre-charge resistor, the electromagnetic contactor, and the electromagnetic switch can be replaced by the DC-DC converter unit 22 and the control unit 20 that controls the DC-DC converter unit 22, and the space for the mounting area can be reduced in comparison with the related art.

Further, even when a failure occurs in the DC-DC converter unit 22 or the servo amplifier 24 (inverter control unit 54), the control unit 20 stops the rotation of the DC-DC converter 30 and the motor 14. Therefore, it is possible to stop the robot (not shown) driven by the motor 14.

[Inventions that can be Grasped from Embodiments]

The invention graspable from the embodiments described above will be recited below. For convenience of understanding, some of the components are given the reference numerals used in the above-described embodiments, but the components are not limited to those given the reference numerals.

The motor control device 10 according to the present invention charges the smoothing capacitor 46 using the DC power supply 16 and controls the driving of the motor 14 using the smoothing capacitor, and includes the DC-DC converter 30 configured to charge the smoothing capacitor by stepping up or stepping down the output voltage Vdc of the DC power supply while limiting the inrush current into the smoothing capacitor, the monitor circuit 32 configured to monitor whether the output of the DC-DC converter is being generated and output the monitor signal Sm, and the control unit 20 configured to output the ON signal for starting or maintaining the operation of the DC-DC converter or the OFF signal for stopping the operation of the DC-DC converter and receive the monitor signal, wherein the control unit outputs the OFF signal to the DC-DC converter when the abnormality of the DC-DC converter has been detected by means of the monitor signal.

With this configuration, the power components including the pre-charge resistor, the electromagnetic contactor, and the electromagnetic switch can be replaced by the power/electronic components (power/electronic circuit) including the DC-DC converter, the monitor circuit, and the control unit. Therefore, the space for the mounting area can be reduced.

The motor control device includes the servo amplifier 24 that includes the inverter 48 that has the input side connected to the smoothing capacitor and the output side connected to the motor and drives the motor, and the inverter control unit 54 configured to control the operation or stop of the inverter.

With this configuration, it is possible to reduce the size of the motor control device including the DC-DC converter and the servo amplifier that supplies AC power from the inverter to the motor.

Furthermore, in the motor control device, the control unit and the servo amplifier may be configured to communicate with each other, and the control unit may output the OFF signal to the DC-DC converter and stop the operation of the inverter via the servo amplifier when the control unit has detected an abnormality of the DC-DC converter by means of the monitor signal.

As described above, when the control unit detects the abnormality of the DC-DC converter by means of the monitor signal, the control unit outputs the OFF signal to the DC-DC converter and stops the inverter via the servo amplifier.

Thus, a stopping operation of the DC-DC converter and a stopping operation of the inverter can be performed in series. Therefore, it is possible to doubly ensure safety for protection of the motor. That is, even when either one of the DC-DC converter or the servo amplifier fails, the motor controller (control unit) can stop the driving of the motor.

Furthermore, in the motor control device, the control unit and the servo amplifier may be configured to communicate with each other, and the control unit may output the OFF signal to the DC-DC converter in a case where even though the control unit transmits the command signal for commanding the operation or stop of the inverter to the servo amplifier, the control unit does not receive a response signal corresponding to the command signal from the servo amplifier.

Thus, the control unit can be operated as a higher-level control unit for the servo amplifier that monitors the operation of the servo amplifier by means of the response signal.

The present invention is not limited to the above-described embodiments, and various configurations can be adopted based on the contents described in this specification.

The invention claimed is:

1. A motor control device that charges a smoothing capacitor using a DC power supply and controls driving of a motor using the smoothing capacitor, the motor control device comprising:
  a DC-DC converter configured to charge the smoothing capacitor by stepping up or stepping down an output voltage of the DC power supply while limiting an inrush current into the smoothing capacitor;
  a monitor circuit configured to monitor whether an output of the DC-DC converter is being generated and output a monitor signal; and
  a control unit configured to output an ON signal for starting or maintaining operation of the DC-DC converter or an OFF signal for stopping the operation of the DC-DC converter and receive the monitor signal,
  wherein the control unit outputs the OFF signal to the DC-DC converter when the control unit has detected an abnormality of the DC-DC converter by means of the monitor signal.

2. The motor control device according to claim 1, further comprising a servo amplifier that includes:
  an inverter that includes an input side connected to the smoothing capacitor and an output side connected to the motor and drives the motor; and
  an inverter control unit configured to control operation or stop of the inverter.

3. The motor control device according to claim 2,
  wherein the control unit and the servo amplifier are configured to communicate with each other, and
  the control unit outputs the OFF signal to the DC-DC converter and stops the operation of the inverter via the servo amplifier when the control unit has detected the abnormality of the DC-DC converter by means of the monitor signal.

4. The motor control device according to claim 2,
wherein the control unit and the servo amplifier are configured to communicate with each other, and
the control unit outputs the OFF signal to the DC-DC converter in a case where even though the control unit transmits a command signal for commanding the operation or the stop of the inverter to the servo amplifier, the control unit does not receive a response signal corresponding to the command signal from the servo amplifier.

* * * * *